United States Patent
Lee et al.

(10) Patent No.: US 8,667,840 B2
(45) Date of Patent: Mar. 11, 2014

(54) WATER LEVEL SENSING APPARATUS

(75) Inventors: In-Tak Lee, Choongcheongnam-do (KR); Hee-Suk Sul, Choongcheongnam-do (KR)

(73) Assignee: Woongjin Cornay Co., Ltd., Yougu-Eup, Gongjoo Choongcheongnam-Do (KR)

( * ) Notice: Subject to any disclaimer, the term of this patent is extended or adjusted under 35 U.S.C. 154(b) by 274 days.

(21) Appl. No.: 13/127,310

(22) PCT Filed: Nov. 3, 2009

(86) PCT No.: PCT/KR2009/006433
§ 371 (c)(1),
(2), (4) Date: May 3, 2011

(87) PCT Pub. No.: WO2010/053284
PCT Pub. Date: May 14, 2010

(65) Prior Publication Data
US 2011/0203366 A1  Aug. 25, 2011

(30) Foreign Application Priority Data

Nov. 4, 2008  (KR) .................. 10-2008-0109106

(51) Int. Cl.
*G01F 23/26* (2006.01)
(52) U.S. Cl.
USPC ....................................... 73/304 C
(58) Field of Classification Search
USPC .......................... 73/304 C; 438/379
See application file for complete search history.

(56) References Cited

U.S. PATENT DOCUMENTS

| | | | |
|---|---|---|---|
| 5,437,184 A * | 8/1995 | Shillady ............. | 73/304 C |
| 2005/0156962 A1 | 7/2005 | Sasaki et al. | |
| 2011/0259098 A1 * | 10/2011 | Park ................... | 73/304 C |

FOREIGN PATENT DOCUMENTS

| | | |
|---|---|---|
| JP | 59-111023 A | 6/1984 |
| JP | 2001165750 | 6/2001 |
| JP | 2002340653 | 11/2002 |
| KR | 2001-0051373 A | 6/2001 |
| KR | 2009-0126015 A | 12/2009 |

OTHER PUBLICATIONS

PCT Search Report and Written Opinion for PCT/KR2009/006433, dated Jun. 23, 2010.

* cited by examiner

*Primary Examiner* — Peter Macchiarolo
*Assistant Examiner* — Tamiko Bellamy
(74) *Attorney, Agent, or Firm* — Dority & Manning, PA

(57) ABSTRACT

There is provided a water level sensing apparatus including: a body disposed to be exposed within a liquid tank and having an accommodating space therein; and a capacitance detecting unit accommodated in the accommodating space of the body, wherein the capacitance detecting unit compares an upper side capacitance value and a lower side capacitance value and turns on or off an output signal. Because a changeable reference that the capacitance values of a reference surface and a detected surface of the body are simultaneously changed is used, even if the body comes in contact with moisture or debris, the reference surface and the detected surface are equally affected by the moisture or debris, thus reducing the occurrence of malfunction.

6 Claims, 2 Drawing Sheets

WATER LEVEL SENSING APPARATUS

TECHNICAL FIELD

The present invention relates to a water level sensing apparatus using a change in capacitance.

BACKGROUND ART

In general, a liquid tank is disposed in a device such as a water purifier, a bidet, a humidifier, an ice maker, and the like, which uses a liquid such as water. A water level sensing apparatus is installed in the liquid tank in order to maintain a uniform level of a liquid such as water in the interior of the liquid tank. The water level sensing apparatus includes a mechanical water level sensing apparatus and an electronic water level sensing apparatus.

The mechanical water level sensing apparatus senses the water level of a liquid by detecting a change in a magnetic force when a float ascends or descends due to its buoyancy in the liquid. The mechanical water level sensing apparatus includes a reed switch, a hall sensor, a magneto-resistance (MR) sensor, and the like.

The electronic water level sensing apparatus includes a capacitance sensor or the like that senses the level of liquid by detecting a change in capacitance.

However, because the related art mechanical water level sensing apparatus requires the float to perform a mechanical operation, there is a possibility that its operation may be defective due to the mechanical structure of the float. In addition, the defective operation of the float may lead to a defective detection by a magnet, making it impossible to accurately measure the water level of the liquid within the liquid tank.

In addition, due to the characteristics of the mechanical structure of the mechanical water level sensing apparatus, debris such as slime may be encrusted on the float or on a float support structure, possibly hindering a magnetic force from being normally detected.

In addition, when the mechanical water level sensing apparatus is detached to remove the slime, it is, in actuality, difficult to remove the slime due to the mechanically complicated shape of the water level sensing apparatus, or much time may be required to clean the slime.

Also, the liquid tank of a water purifier is fabricated to have a smooth inner wall in order to prevent formation of scratches thereupon, thus minimizing the possibility of becoming dirty (i.e., preventing the inner wall from being covered with dirt). Also, if a structure is installed within the liquid tank, the structure would be inevitably covered with dirt in any event, therefore, structures within the interior of the liquid tank are avoided as much as possible in designing a water purifier.

Thus, an installation of the mechanical water level sensing apparatus having a complicated external appearance within the liquid tank would result in an easy collection of debris on the outer surface of the water level sensing apparatus, contaminating purified water. Also, in this case, the interior of the liquid tank and the water level sensing apparatus should be cleaned more frequently.

In addition, because the mechanical water level sensing apparatus has a complicated structure in which the float ascends or descends, or the float is fixedly coupled with the liquid tank, the size and unit fabrication cost of the water level sensing apparatus increase.

In addition, because the capacitance sensor is installed on an outer wall surface of the liquid tank, it easily malfunctions due to the influence of moisture or debris around the liquid tank.

DISCLOSURE OF INVENTION

Technical Problem

An aspect of the present invention provides a water level sensing apparatus having a smooth external appearance that cannot be easily covered with dirt.

An aspect of the present invention also provides a water level sensing apparatus capable of having debris easily removed and shortening a cleaning time.

An aspect of the present invention also provides a water level sensing apparatus capable of reducing a fabrication unit cost.

An aspect of the present invention also provides a water level sensing apparatus capable of preventing the occurrence of a malfunction due to an external influence such as moisture, debris, or the like.

Solution to Problem

According to an aspect of the present invention, there is provided a water level sensing apparatus including: a body disposed to be exposed within a liquid tank and having an accommodating space therein; and a capacitance detecting unit accommodated in the accommodating space of the body, wherein the capacitance detecting unit compares an upper side capacitance value and a lower side capacitance value and generates an 'ON' or 'OFF' output signal.

The body and the capacitance detecting unit may extend in a horizontal direction within the liquid tank.

The thickness of a lower portion of the body may be smaller than that of an upper portion of the body.

If the upper side capacitance value is larger than the lower side capacitance value, the capacitance detecting unit may generate the 'OFF' output signal, whereas if the lower side capacitance value is larger than the upper side capacitance value, the capacitance detecting unit may generate the 'ON' output signal.

The accommodating space of the body may be hermetically sealed by a synthetic resin after the capacitance detecting unit is inserted therein.

The capacitance detecting unit may be inserted such that an upper gap and a lower gap with the accommodating space of the body are equal, and is hermetically sealed by a synthetic resin having the same dielectric constant.

The capacitance detecting unit may be a printed board assembly (PBA).

Advantageous Effects of Invention

According to an exemplary embodiment of the present invention, because the outer surface of the water level sensing apparatus is formed to be smooth, the gathering of debris on the outer surface of the water level sensing apparatus can be minimized, thus lengthening the interval between a cleaning period. Namely, because the outer surface of the water level sensing apparatus cannot easily become dirt covered, it can be cleaned less frequently.

The outer surface of the water level sensing apparatus can be easily cleaned, and the cleaning time duration can be shortened.

Even if the water level sensing apparatus is affected by external factors such as temperature, moisture, debris, and the like, it infrequently malfunctions.

Because elements such as a float required to perform a mechanical operation, a magnet for operating a magnetic sensor, and the like, are omitted, the possibility of causing a defective operation can be lowered.

MODE FOR THE INVENTION

Hereinafter, a water level sensing apparatus according to an exemplary embodiment of the present invention will be described with reference to the accompanying drawings.

Figure 1:
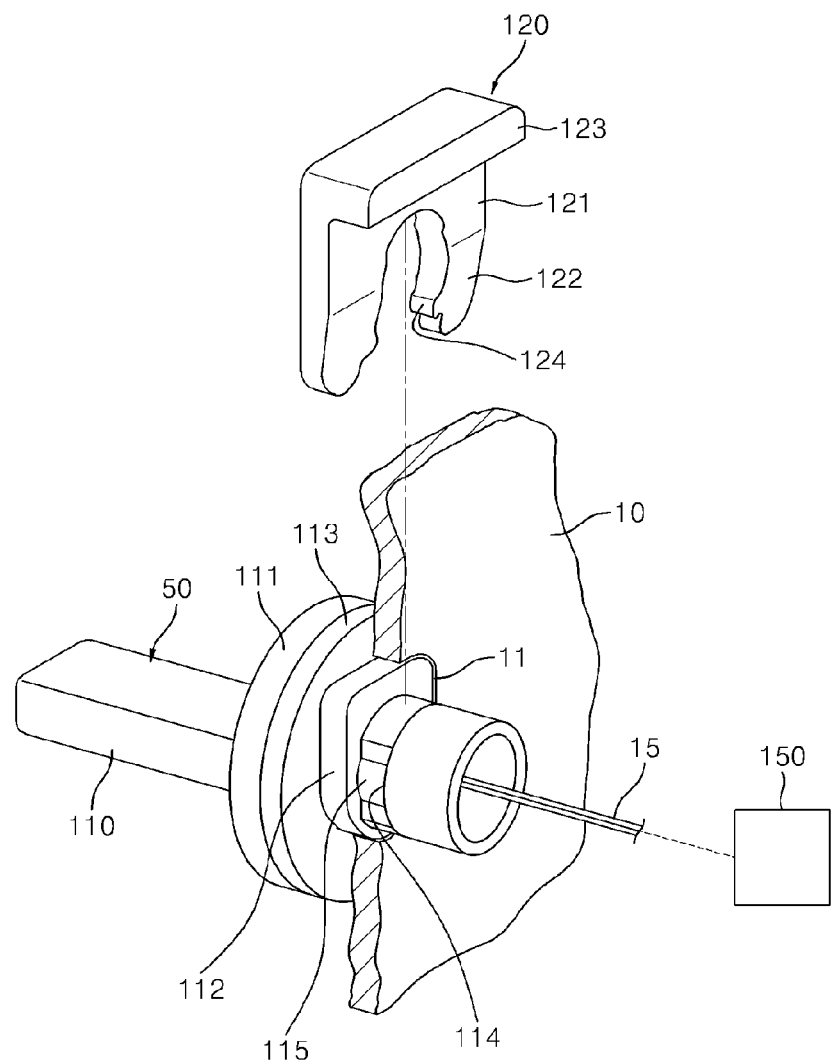
FIG. 1 is a perspective view of a water level sensing apparatus according to an exemplary embodiment of the present invention.

FIG. 1 is a perspective view of a water level sensing apparatus according to an exemplary embodiment of the present invention.

With reference to FIG. 1, a water level sensing apparatus 50 may be installed on a wall face or the bottom of a liquid tank 10 accommodating a liquid. An insertion hole 11 may be formed in the liquid tank 10 to allow the water level sensing apparatus 50 to be inserted therein. The water level sensing apparatus 50 senses the water level of various liquids such as water or oil accommodated in the liquid tank 10.

The water level sensing apparatus 50 may be installed at the highest water level of the liquid tank 10 or may be installed at the highest or lowest water level. Also, the water level sensing apparatus 50 may be installed at positions of a plurality of heights of the liquid tank 10.

The water level sensing apparatus 50 may include a body 110 disposed to be exposed within the liquid tank 10, a capacitance detection unit 130 accommodated within the body 110, and a controller 150 configured to control the water level of the liquid tank 10 according to an output value from the capacitance detection unit 130. The body 110 and the capacitance detection unit 130 are installed to extend in a horizontal direction within the liquid tank 10.

A disk unit 111, substantially having a disk-like shape, may be formed on an outer circumferential surface of the body 110. A rotation hampering unit 112 may be protrusively formed on the outer circumferential surface of the body 110 such that it is spaced apart from the disk unit 111. In this case, the rotation hampering unit 112 may have a polygonal shape corresponding to the insertion hole 11 of the liquid tank 10. Accordingly, the rotation hampering unit 112 is inserted into the insertion hole 11 of the liquid tank 10 to prevent the body 110 from being rotated.

A packing 113 made of a flexible material is installed between the disk unit 111 and the rotation hampering unit 112. The packing 113 may be installed to be in surface-contact with the disk unit 111. The packing 113 may have a disk-like shape with a hole formed on its central portion. The packing 113 prevents a liquid from being leaked from the insertion hole 11 of the liquid tank 10.

A stop protrusion 114 is formed on the outer circumferential surface of the body 110 such that it is spaced apart from the rotation hampering unit 112. The stop protrusion 114 may be formed as recesses 115 are formed on both sides of the outer circumferential surface of the body 110. In addition, the stop protrusion 114 may be formed to be outwardly protruded from the outer circumferential surface of the body 110.

A fixing key 120 is installed to be inserted into the recesses 115 along a wall surface direction of the liquid tank 10 in order to compress the packing 113 to the wall surface of the liquid tank 10.

The fixing key 120 may include a compression rib 121 inserted in the recesses 115 formed between the stop protrusion 114 and the outer circumferential surface of the liquid tank 10 in order to compress the packing 113.

The thickness of the rotation hampering unit 112 may be smaller than the wall face or the bottom surface of the liquid tank 10. A wedge-type tapered portion 122 may be formed at an end portion of the compression rib 121. The tapered portion 122 allows the compression rib 121 of the fixing key 120 to be easily inserted to between the stop protrusion 114 and the rotation hampering unit 112. An upper portion of the tapered portion 122 of the compression rib 121 makes the packing 113 further compressed to the inner surface of the liquid tank 10, improving the sealing capacity.

The fixing key 120 may include a handle unit 123 to allow the fixing key 120 to be grasped and taken out. The handle unit 123 may be protruded to be substantially perpendicular to the compression rib 121.

The compression rib 121 may include a protuberance 124 protruded toward the center to prevent the compression rib 121 from being released.

Figure 2:
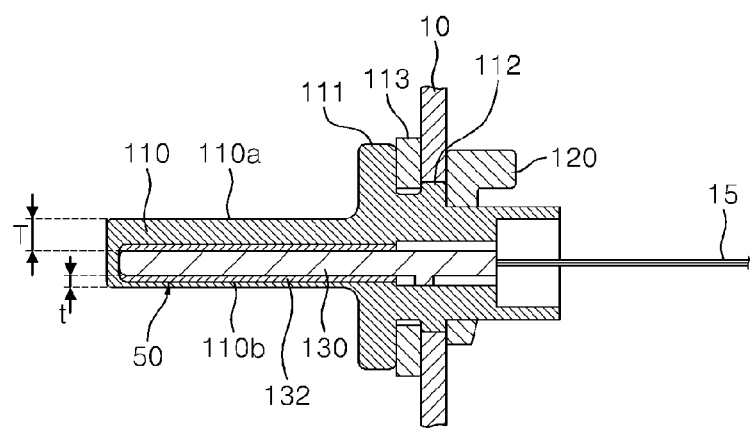
FIG. 2 is a sectional view of the water level sensing apparatus of FIG. 1.
Figure 3:
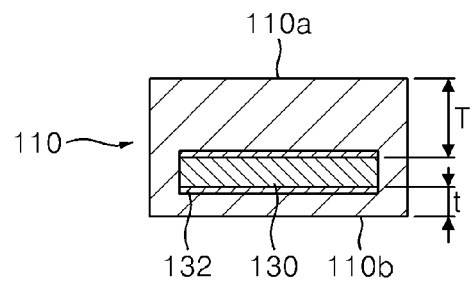
FIG. 3 is a sectional view of a body of the water level sensing apparatus of FIG. 1.

FIG. 2 is a sectional view of the water level sensing apparatus, and FIG. 3 is a sectional view of the body of the water level sensing apparatus.

With reference to FIGS. 2 and 3, the body 110 has an accommodation space in which the capacitance detection unit 130 (See FIG. 2) is insertedly positioned. An electric wire 15 is connected to the capacitance detection unit 130. The electric wire 15 is connected with the controller 150. The body 110 is made of a material, such as plastic, having a dielectric constant greater than that of air but smaller than that of liquid.

The capacitance detection unit 130 may be a plat-like printed board assembly (PBA). Here, the PBA generally refers to a completely processed printed circuit or a printed wiring.

After the capacitance detection unit 130 is inserted into the accommodation space of the body 110, the accommodation space is hermetically sealed with a synthetic resin 132. Accordingly, the capacitance detection unit 130 can be prevented from being affected by internal moisture of the liquid tank 10, a foreign material (e.g., debris), or the like. The capacitance detection unit 130 may be insertedly positioned in the accommodation space such that an upper gap between the capacitance detection unit 130 and the accommodation space of the body 110 and a lower gap between the capacitance detection unit 130 and the accommodation space of the body 110 are equal. By hermetically sealing the accommodation space of the body 110 with a synthetic resin 132 having the same dielectric constant, a detection tolerance between a reference plane and a detected plane can be minimized.

As the synthetic resin 132, an epoxy resin may be used. However, without being limited thereto, any type of synthetic resin can be used so long as it can hermetically seal the accommodation space of the body 110.

The epoxy resin has the following advantages.

First, the epoxy resin has a strong adhesive force, does not cause a by-product when reacted with, and is hardened (cured) at room temperature. In addition, when it is hardened, a reaction contraction is very small, exhibiting good stability with respect to dimensional deformation. The epoxy resin has good electrical properties, good water-proofing, good abrasion resistance and adhesive properties, good climate resistance, good chemical resistance, and the like. Thus, the epoxy resin can be stably used for various liquids.

The thickness (T) of an upper portion 110a of the body 110 and that (t) of a lower portion 110b of the body 110 based on the capacitance detection unit 130 are different. The thickness (t) of the lower portion 110b of the body 110 is smaller than the thickness (T) of the upper portion 110a of the body 110 (T>t). The reason is because if the liquid comes in contact with the lower portion 110b of the body 110, a variation in the width of the capacitance increases, allowing for a sensitive detection of the water level.

Because the thicknesses (T and t) of the upper portion 110a and the lower portion 110b of the body 110 are different, an upper side capacitance value and a lower side capacitance value vary depending on whether the liquid comes in contact with the body 110.

The formula of the capacitance is $C=e(K*(A/d))$. Here, 'C' is capacitance [pF], 'e' is an absolute dielectric constant [pF/mm] in a free space, 'K' is a dielectric constant of an insulator, 'A' is an effective overlapping sectional area between conductors, and 'd' is the distance between the conductors.

The capacitance is formed when a dielectric substance (insulator) is positioned between two conductors each having a different potential. The size of the capacitance is determined by the distance (d) between the conductors, the overlapping sectional area (A) between conductors, and the dielectric constant (K) of the dielectric substance.

As for a conventional capacitance sensor, when liquid comes into contact with a detection plane (i.e., one face brought into contact with the liquid tank) of the capacitance sensor, the capacitance sensor uses a fixed reference for sensing a water level by comparing a fixed value of a reference plane (i.e., one face which is exposed outside) and a changed dielectric value of the detection plane. In this case, when moisture or debris is in contact with the detection plane, there is a difference in a capacitance value due to moisture or debris, causing a malfunction in detecting a water level.

However, in the case of the capacitance water level sensing apparatus 50 according to an exemplary embodiment of the present invention whose body 110 is installed to be exposed within the liquid tank 10, when debris and moisture come into contact with the reference plane (i.e., the upper portion 110a of the body 110) and the detection plane (i.e., the lower portion 110b of the body 110) simultaneously, a variable reference in which a capacitance value of the reference plane of the body 110 and that of the detection plane are simultaneously changed is used. Thus, even if moisture or debris is in contact with the body 110 of the capacitance water level sensing apparatus 50, the reference plane and the detection plane are equally affected by the moisture or debris, so the malfunctioning of the water level sensing apparatus 50 can be prevented.

Meanwhile, as the water level sensing apparatus 50 does not have a float, a float lifting/lowering structure, and the like, and the capacitance detection unit 130 performs detection electrically, the outer surface of the body 110 can be formed to be smooth. Thus, the outer surface of the water level sensing apparatus 50 can be prevented from being incrusted with slime or the like. In addition, a duration of the cleaning time required by the water level sensing apparatus 50 can be shortened, and a cleaning period can be lengthened.

The operation of the water level sensing apparatus according to an exemplary embodiment of the present invention will now be described.

First, the case where the water level sensing apparatus 50 is installed as a highest water level sensing apparatus for measuring the highest water level will now be described.

With reference to FIG. 2, when the water level of the liquid tank 10 is lower than the water level sensing apparatus 50, both the upper portion 110a and lower portion 110b of the body 110 of the water level sensing apparatus 50 are in contact with air. In this case, because the thickness of the upper portion 110a of the body 110, namely, the reference plane, is greater than the thickness of the lower portion 110b of the body 110, namely, the detection plane, a capacitance value of the upper portion 110a of the body 110 is larger than that of the lower portion 110b of the body 110. Because a dielectric constant of air is smaller than that of the body 110, air does not greatly affect the capacitance values of the upper portion 110a and the lower portion 110b of the body.

Accordingly, the sum of the capacitance value of the upper portion 110a of the body 110 and that of air is greater than the sum of the capacitance value of the lower portion 110b of the body 110 and that of air. Thus, when both the upper portion 110a and the lower portion 110b of the body 110 are in contact with air, because an upper side capacitance value is larger than a lower side capacitance value, the capacitance detection unit 130 generates an 'OFF' output signal.

In addition, although the upper portion 110a and the lower portion 110b of the body 110 are in contact with moisture, because the capacitance values of the upper portion 110a and the lower portion 110b of the body 110 change simultaneously, malfunction of the water level sensing apparatus can be prevented.

Subsequently, the controller 150 determines that the water level of the liquid tank 10 is still low. Then, the controller 150 may provide control to open the valve to continuously supply the liquid to the liquid tank 10.

As the liquid is supplied to the liquid tank 10, the water level of the liquid tank 10 rises gradually.

Soon, the liquid having a significantly higher dielectric constant than that of air is in contact with the lower portion 110b of the body 110. Then, the sum of the capacitance value of the lower portion 110b of the body 110 and that of the liquid is considerably larger than the sum of the capacitance value of the upper portion 110a of the body 110 and that of air. When the lower side capacitance value is larger than the upper side capacitance value, the capacitance detection unit 130 generates an 'ON' output signal and transmits the same to the controller 150.

If the controller 150 determines that the liquid is filled up to a maximum water level within the liquid tank 10 according to the output signal, the controller 150 provides control to shut the valve to interrupt the supply of the liquid to the liquid tank 10.

Next, the case where the water level sensing apparatus 50 is installed at the lowest water level position and at the highest water level position of the liquid tank 10 will now be described. Herebelow, the water level sensing apparatus 50 installed at the lowest water level position will be referred to as a lowest water level sensing apparatus 50 and the water level sensing apparatus 50 installed at the highest water level position will be referred to as a highest water level sensing apparatus 50.

When the body 110 of the lowest water level sensing apparatus 50 is submerged in the liquid, both the upper portion 110a and the lower portion 110b of the body 110 are in contact with the liquid. Because the dielectric constant of the body 110 is smaller than that of water, the body 110 does not greatly affect the capacitance values of the upper portion 110a and the lower portion 110b of the body 110. Also, because the space between the lower portion 110*b* of the body 110 and the liquid is smaller than the space between the upper portion 110*a* of the body 110 and the liquid, the capacitance value according to the contact with the liquid greatly works to the lower portion 110*b* of the body 110, rather than to the upper portion 110*a* of the body 110.

Accordingly, the sum of the capacitance value of the lower portion 110*b* of the body 110 and that of the liquid is larger than the sum of the capacitance value of the upper portion 110*a* of the body 110 and that of the liquid. Then, the capacitance detection unit 130 generates an 'ON' output signal, and transmits it to the controller 150.

Upon recognizing that the liquid has been supplied as high as the lowest water level of the liquid tank 10, the controller 150 controls a corresponding unit.

When the liquid of the liquid tank is in contact with the lower portion 110*b* of the body 110 of the highest water level sensing apparatus, an output signal is outputted in the same manner as when the liquid is in contact with the lower portion of the water level sensing apparatus as described above. And, the controller controls the valve to interrupt the liquid supply.

The water level sensing apparatus can be applicable for a water tank of a water purifier, a water tub of an air purifier or a humidifier, a water tank of a bidet, and the like. In addition, the water level sensing apparatus can be also applicable to a tank in which various liquids are stored.

INDUSTRIAL APPLICABILITY

An aspect of the present invention minimizes the outer surface of the water level sensing apparatus from being covered with debris (e.g., from being incrusted with slime), facilitates cleaning, and does not cause malfunction.

What is claimed is:

1. A water level sensing apparatus comprising:
   a body disposed to be exposed within a liquid tank and having an accommodating space therein; and
   a capacitance detecting unit accommodated in the accommodating space of the body, wherein the capacitance detecting unit compares an upper side capacitance value and a lower side capacitance value and generates an "ON" or "OFF" output signal,
   wherein the thickness of a lower portion of the body is less than that of an upper portion of the body.

2. The apparatus of claim 1, wherein the body and the capacitance detecting unit extend in a horizontal direction within the liquid tank.

3. The apparatus of claim 1, wherein if the upper side capacitance value is larger than the lower side capacitance value, the capacitance detecting unit generates the "OFF" output signal, where if the lower side capacitance value is larger than the upper side capacitance value, the capacitance detecting unit generates the "ON" output signal.

4. The apparatus of claim 1, wherein the accommodating space of the body is hermetically sealed by a synthetic resin after the capacitance detecting unit is inserted therein.

5. The apparatus of claim 4, wherein the capacitance detecting unit is inserted such that an upper gap and a lower gap with the accommodating space of the body are equal, and is hermetically sealed by a synthetic resin having the same dielectric constant.

6. The apparatus of claim 1, wherein the capacitance detecting unit is a printed board assembly (PBA).

* * * * *